(12) United States Patent
Luling

(10) Patent No.: US 8,963,072 B2
(45) Date of Patent: *Feb. 24, 2015

(54) SYSTEMS AND METHODS USING TANDEM GRAVIMETER

(71) Applicant: Schlumberger Technology Corporation, Sugar Land, TX (US)

(72) Inventor: Martin G. Luling, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 120 days.

This patent is subject to a terminal disclaimer.

(21) Appl. No.: 13/720,977

(22) Filed: Dec. 19, 2012

(65) Prior Publication Data

US 2013/0161504 A1    Jun. 27, 2013

Related U.S. Application Data

(60) Provisional application No. 61/578,849, filed on Dec. 21, 2011.

(51) Int. Cl.
*G01V 5/12* (2006.01)

(52) U.S. Cl.
CPC ........................................ *G01V 5/12* (2013.01)
USPC ...................................................... 250/269.3

(58) Field of Classification Search
CPC ......................................................... G01V 5/12
USPC ....................................................... 250/269.3
See application file for complete search history.

(56) References Cited

U.S. PATENT DOCUMENTS

2013/0161503 A1*    6/2013  Luling et al. ............... 250/269.3

OTHER PUBLICATIONS

Steven Weinberg, "Gravitation and Cosmology", Wiley (1972), in chapter 3.5, pp. 82-83.
A. Messiah, "Quantum Mechanics", North Holland Publishing, 8th edition 1976, Ch. XVI § 12, pp. 706-708.
R. V. Pound & G. A. Rebka, "Variation with Temperature of the Energy of Recoil-Free Gamma Rays from Solids," Phy. Rev. Letters 4, 1960, pp. 274-275.
R. V. Pound & J. L. Snider, "Effect of Gravity on Nuclear Resonance," Phys. Rev. Letters, 13, (1964), pp. 539-540.
R. V. Pound & J. L. Snider, "Effect of Gravity on Gamma Radiation," Phys. Rev., 140B, (1965), pp. 788-804.
E. Ikonen et al, "Magnetic phase modulation of recoilless gamma radiation by nuclear Zeeman effect," Phys. Rev. Lett, 60 (1988), 643-646.
I. Tittonen et al, "Observation of Messbauer resonance line splitting caused by Rabi oscillations," Phys. Rev. Lett., 69 (1992), pp. 2815-2818.
M. Lippmaa et al, "Mossbauer—NMR double resonance," Phys. Rev. B, 52 (1995) pp. 10268-10271.
T.W. Sinor et al, "Thermomechanical frequency modulation of γ radiation," Phys. Rev. Lett., 66 (1991), pp. 1934-1937.

* cited by examiner

*Primary Examiner* — David Porta
*Assistant Examiner* — Hugh Maupin
(74) *Attorney, Agent, or Firm* — Stephanie Chi; Jody DeStefanis

(57) ABSTRACT

Systems and methods are provided for determining a property, e.g., density, of a geological formation based on Einstein's theory of gravitation. A tandem-structured gravimeter uses two gamma radiations emitted to two directions to determine a gravitational potential difference between two positions of the geological formation. The gravimeter can be a part of a downhole tool. The gravitational potential difference determined can be used to determine the property of the geological formation.

17 Claims, 9 Drawing Sheets

SYSTEMS AND METHODS USING TANDEM GRAVIMETER

CROSS REFERENCE TO RELATED APPLICATIONS

This application claims the benefit of U.S. Provisional Application No. 61/578,849, filed Dec. 21, 2011.

BACKGROUND

Gravimetry is a type of measurement that has been used for reservoir characterization and gas-movement monitoring. Some commercially available gravimeters have been based on Newton's theory of gravitation. For example, Lacoste-Romberg gravimeters use a zero-length spring to monitor the gravitational force on a small test mass. Some gravimeters monitor the time of flight of a free-falling object or the oscillation time of a pendulum. More recently, some gravimetry measurements monitor the position of a superconducting niobium sphere suspended by a magnetic field.

In contrast to Newton's theory of gravitation, Einstein's theory of gravitation introduces a general relationship between a geometric structure of space-time and the presence of massive bodies. Einstein's theory predicts a time dilatation in the presence of a massive body. Such time dilatation is referred as "Gravitational Red Shift".

Nuclear spectroscopy offers a process that has been used to observe and confirm the gravitational red shift predicted by Einstein's theory of gravitation. For example, the isotope $^{57}$Fe nucleus can emit from its lowest excited state a 14.4 keV photon. This state can have an approximate lifetime of 140 nanosecond (ns), a spectral-line width of about $10^{-8}$ eV or a relative line width of about $9.2 \times 10^{-13}$. The Mössbauer effect recognizes that a nuclear transition has a high frequency precision, or narrow spectral line width, such as that of the $^{57}$Fe nucleus. The Mössbauer effect has successfully been used to measure/verify the gravitational red shift, as predicted by Einstein's theory of gravitation. Pound and Rebka in 1960 were the first to use a Mössbauer experiment to quantitatively confirm the gravitational red shift of Einstein's theory of gravitation.

SUMMARY

Generally, systems, methods and techniques are described that are directed to determining properties of a geological formation, by determining a gravitational potential difference between positions of a geological formation. The gravitational potential difference can be determined by using two gamma radiations emitted to different directions and measuring frequency shifts of the gamma radiations. As one example, a density of a geological formation may be determined from the gravitational potential difference determined.

In one embodiment, a system is provided for obtaining a property of a geological formation. The system includes a component including a first portion and a second portion. The first portion extends from a first position to a second position and the second portion extends from the second position to a third position. The first portion includes a first source, a first absorber, and a first detector, the first portion to measure a first frequency shift of gamma radiation travelling between the first position and the second position. The first frequency shift is resulted from a gravitational potential difference between the first and second positions. The second portion includes a second source, a second absorber, and a second detector, the second portion to measure a second frequency shift of gamma radiation travelling between the second position and the third position. The second frequency shift is resulted from a gravitational potential difference between the second and third positions, The first and second sources respectively emit a first gamma radiation and a second gamma radiation to the first and second absorbers. The first and second absorbers absorb the gamma radiation or a portion of the gamma radiation emitted from the respective source. The first and second detectors are operatively connected to the first and second absorbers respectively to detect the absorption and to respectively generate first signal(s) associated with the first frequency shift and second signal(s) associated with the second frequency shift.

Processor(s) are operatively connected to the first and second detectors. The processors receive the first signal(s) associated with the first frequency shift and the second signal(s) associated with the second frequency shift from the first and second detectors respectively, determine a gravitational potential difference between the first position and the third position from the signals received, and determine the property of the geological formation between the first and third positions from the gravitational potential difference determined.

In another embodiment, a method is provided for determining a property of a geological formation. The method includes emitting a first gamma radiation between a first position and a second position of the geological formation. The first gamma radiation travelling between the first position and the second position has a first frequency shift. The first frequency shift is resulted from a gravitational potential difference between the first and second positions. The method includes emitting a second gamma radiation between the second position and a third position of the geological formation. The second gamma radiation travelling between the second position and the third position has a second frequency shift resulted from a gravitational potential difference between the second and third positions.

The method further includes absorbing a least a portion of the first gamma radiation, and absorbing at least a portion of the second gamma radiation. The absorption of the first gamma radiation is detected to generate first signal(s) associated with the first frequency shift. The absorption of the second gamma radiation is detected to generate second signal(s) associated with the second frequency shift. A gravitational potential difference between the first and third positions is determined based on the first signal(s) and the second signal(s). The property of the geological formation is determined based on the gravitational potential difference determined.

This summary is provided to introduce a selection of concepts that are further described below in the detailed description. This summary is not intended to identify key or essential features of the claimed subject matter, nor is it intended to be used as an aid in limiting the scope of the claimed subject matter.

DETAILED DESCRIPTION

Systems, methods and techniques are described herein for determining a property of a geological formation based on Einstein's theory of gravitation.

Einstein's theory predicts a time dilatation in the presence of a massive body. For example, in the presence of the earth, the frequency f of a radiation at two positions of a geological formation can be different if there is a gravitational potential difference between these two positions. The radiation can have, for example, a nuclear spectral line at a certain energy or frequency. For example, the nucleus of isotope $^{57}$Fe can emit a 14.4 keV photon with a spectral-line width of about $10^{-8}$ eV. At a first position of the geological formation, the nuclear spectral line of the radiation has a frequency $f_1$, and at a second position of the geological formation, the frequency can change to be $f_2$. The frequency difference $\delta f = f_1 - f_2$ can be expressed as:

$$\delta f = f_1 - f_2 = \left[\sqrt{1 - \frac{2}{c^2}\Phi(M, r_1)} - \sqrt{1 - \frac{2}{c^2}\Phi(M, r_2)}\right] f_0 \quad (1)$$

where $r_1$ is the radius of the first position of the geological formation; $r_2$ is the radius of the second position of the geological formation; $\Phi((M, r_1)$ is the gravitational potential at the first position; $\Phi(M, r_2)$ is the gravitational potential at the second position; $f_0$ is the frequency of the radiation in the absence of any heavy body; c is the speed of light in vacuum; and M is the mass of the earth.

An approximation of Equation (1) can be $$\delta f = f_1 - f_2 \cong [\Phi(M, r_1) - \Phi(M, r_2)] \frac{f_0}{c^2} \quad (2)$$

Equation (1) or (2) illustrates the relationship between a frequency shift and a gravitational potential difference.

A gravitational potential difference, such as $\delta\Phi(M,r_1)=[\Phi(M,r_1)-\Phi(M,r_2)]$, can be determined from a measured frequency shift, such as $\delta f = f_1 - f_2$, by $$\delta\Phi(M, r_1) = \Phi(M, r_1) - \Phi(M, r_1 - \delta r) \cong 2\frac{f_1 - f_2}{f_1 + f_2} c^2 \quad (3)$$

where $\delta r = r_1 - r_2$ is a vertical distance between the first and second positions. The vertical distance described herein refers to a distance in the direction of a gravitational force.

A property of the geological formation, e.g., the average formation density between the first and second positions, can be determined from the gravitational potential difference determined, which will be described further below.

Figure 1A:
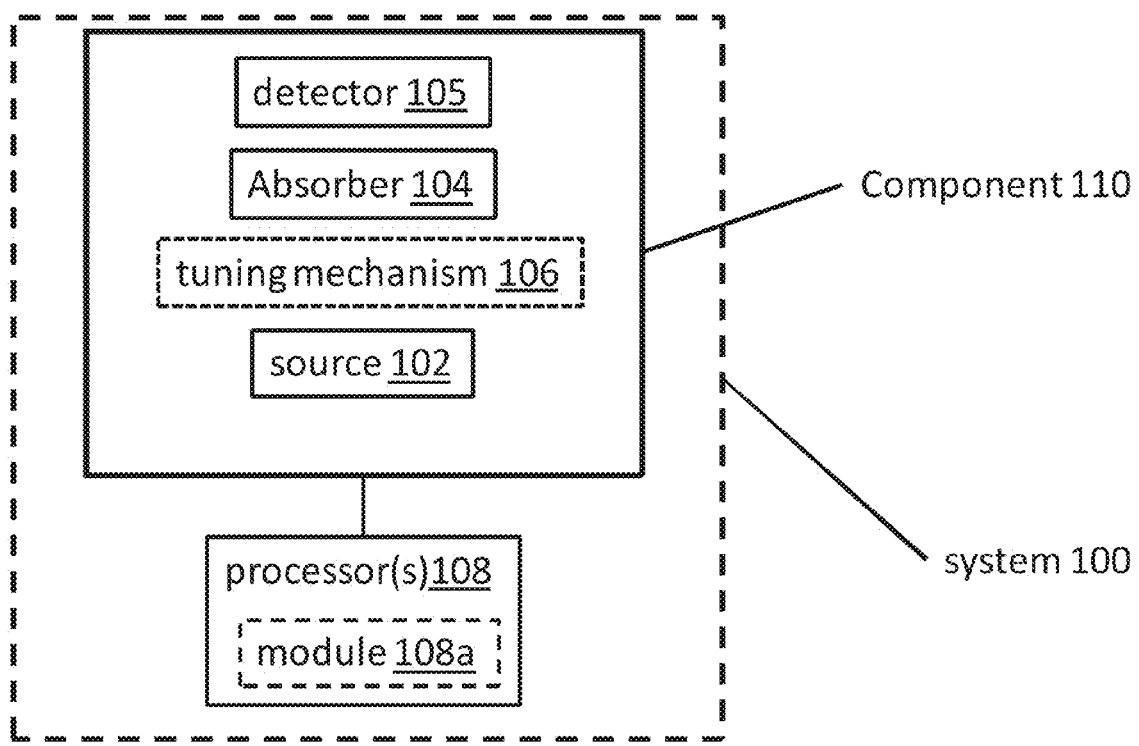
FIG. 1a illustrates a schematic diagram of an example system described herein.

FIG. 1a illustrates an example system 100 for determining a property of a geological formation. The system 100 can be associated with an instrument, e.g., a downhole tool, but may not be limited to a downhole tool. The system 100 includes a component 110 and at least one processor 108 operatively connected to the component 110. The component 110 can have a differential gravimeter that includes a source 102 to generate radiation, an absorber 104 to absorb the radiation from the source 102, and optionally a tuning mechanism 106. The processor 108 is operatively connected to the component 110 for receiving and/or sending signal(s) from/to the component 110 and processing the signal(s). The processor 108 can include one or more modules, e.g., 108a, further described below to help with processing measurements and/or signals.

The source 102 generates radiation, e.g., gamma radiation, emitted to the absorber 104. The radiation travelling from the source 102 to the absorber 104 can have a frequency shift resulted from a gravitational potential difference between the position of the source 102 and the position of the absorber 104. This frequency shift can be compensated by the tuning mechanism 106, which is operatively connected to at least one of the source 102 and the absorber 104, such that the radiation can be resonantly absorbed by the absorber 104. Resonance absorption described herein can refer to an absorption process where the frequency of an incoming absorbed photon agrees with a characteristic resonance frequency of an absorbing material. For example, if the two frequencies match within a spectral line width of the photons, resonance absorption can occur. The probability of a resonance absorption process can be measured by a resonance absorption cross section which can be related to the wavelength of photons.

A detector 105 can be operatively connected to the absorber 104 to detect the absorption and generate one or more signals associated with the frequency shift. The signal(s) are received and processed by the processor 108. The processor 108 may send control signals to the component 110 to control its operation. It will be appreciated that one or more processors can be used. The processor 108 can include one or more modules, e.g., 108a, further described below to help with processing measurements and/or signals.

The system 100 can be used to determine a property of a geological formation. In one embodiment, a density of the geological formation can be determined by the system 100. It will be appreciated that other properties of the geological formation may be determined separate from and/or in addition to the formation density, e.g., fluid compositions, the change of the formation density, and/or the gravitational potential difference(s). For example, the system 100 can be used to monitor changes in fluid composition of the geological formation. The formation density may be influenced by, for example, fluid content, mineralogy, and/or lithology. A density change may be due to, for example, a change in fluid content such as, for example, from relative contents of gas and water, and/or compaction of rock during depletion.

The source 102 and the absorber 104 can include at least one isotope, for example, $^{57}$Fe, $^{67}$Zn, $^{109}$Ag, $^{107}$Ag, $^{103}$Rh, and $^{189}$Os, etc. The term "isotope" described herein can include a nuclear isomer, which is, for example, a metastable state of an atomic nucleus caused by the excitation of one or more of its nucleons. Table 1 summarizes some properties of example isotopes that may be employed. It is to be understood that other isotopes suitable for resonance absorption can also be used. In one embodiment, the source 102 and the absorber 104 can include the same isotope(s), for example, the absorber 104 can be a crystal including the same decay material or isotope(s) as the source 102.

TABLE 1

Properties of isotopes

| Isotope | Energy [keV] | Lifetime | Natural Line Width [eV] | Resolution | Recoilless Fraction | Half life of Parent |
|---|---|---|---|---|---|---|
| $^{57}$Fe | 14.4 | 140 ns | $1.3 \times 10^{-8}$ | $9.2 \times 10^{-13}$ | 0.7* | 270 days |
| $^{67}$Zn | 93.3 | 9.4 μs | $1.4 \times 10^{-11}$ | $1.5 \times 10^{-15}$ | 0.0212 | 78 hr |
| $^{107}$Ag | 93.5 | 63 s | $1.05 \times 10^{-17}$ | $1.1 \times 10^{-22}$ | 0.0377 | 6.5 hr |
| $^{109}$Ag | 88 | 57 s | $1.16 \times 10^{-17}$ | $1.3 \times 10^{-22}$ | 0.0535 | 464 days |
| $^{103}$Rh | 39.75 | 81 min | $1.35 \times 10^{-19}$ | $3.4 \times 10^{-24}$ | 0.756 | 11.96 days |
| $^{189}$Os | 30.8 | 8.7 hr | $2.1 \times 10^{-20}$ | $6.8 \times 10^{-25}$ | 0.905 | 13 days |

*at room temperature (about 300 K).
Reference(s): A. Davydov, Hyperfine Interactions, 135 (2001), 125-153.

In one embodiment, a beta-radioactive isotope of an element, such as one of the isotopes listed in Table 1, can be included in the source 102 and/or the absorber 104. The isotope can exist in, for example, a monocrystalline form, a ceramics form, or metals. The beta decay of the isotope can emit an associated photon from an excitation state with a lifetime τ. The line width Γ=h/τ (h is Planck's constant) can be as narrow as the line widths for example listed in Table 1, and a gravimeter can have a resolution comparable to the resolutions listed in Table 1. As listed in Table 1, the values of the resolution can be obtained from the natural line width divided by the energy.

Figure 1B:
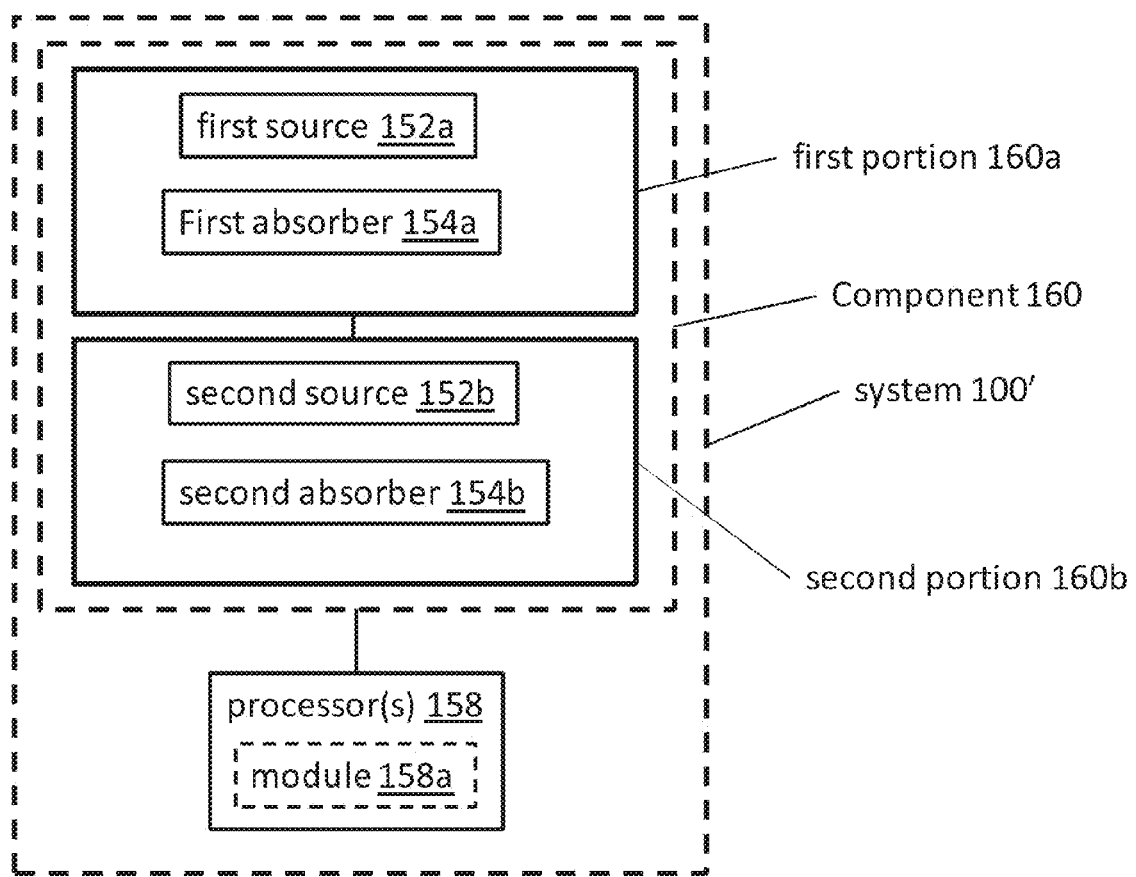
FIG. 1b illustrates a schematic diagram of an example system including a tandem gravimeter described herein.

FIG. 1b illustrates another example system 100' for determining a property of a geological formation. The system 100' can be associated with an instrument, e.g., a downhole tool, but may not be limited to a downhole tool. The system 100' includes a component 160 and at least one processor 158 operatively connected to the component 160. The component 160 can have a tandem-structured gravimeter that includes a first portion 160a and a second portion 160b. The first portion 160a includes a first source 152a to generate radiation, a first absorber 154a to absorb the radiation from the first source 152a. The second portion 160b includes a second source 152b to generate radiation, a second absorber 154b to absorb at least a portion of the radiation from the second source 152b. The processor 158 is operatively connected to the component 160 for receiving and/or sending signal(s) from/to the component 160 and processing the signal(s). Similar to the processor 108, the processor 158 can include one or more modules, e.g., 158a, as further described below, to help with processing measurements and/or signals.

The first portion 160a can extend between a first position and a second position of the component 160. The second portion 160b can extend between a third position and the second position of the component 160. In one embodiment, the component 160 can be positioned in a geological formation.

The first/second source 152a/152b generates radiation, e.g., gamma radiation, emitted to the first/second absorber 154a/154b. In one embodiment, the first and second sources generate gamma radiation simultaneously. The radiation travelling from the first source 152a to the first absorber 154a can have a first frequency shift resulted from a first gravitational potential difference between the first position and the second position. The radiation travelling from the second source 152b to the second absorber 154b can have a second frequency shift resulted from a second gravitational potential difference between the second position and the third position. One of the first frequency shift and the second frequency shift can be a blue shift and the other can be a red shift. The blue shift refers to an increase of the frequency of, for example, photons. The red shift refers to a decrease of the frequency of, for example, photons.

One or more tuning mechanisms, such as the tuning mechanism 106 of FIG. 1(a), can be operatively connected to at least one of the first source 152a, the second source 152b, the first absorber 154a, and the second absorber 154b to compensate the first and/or second frequency shifts and induce a resonant absorption of the first and/or second gamma radiations. In one embodiment, the tuning mechanism includes a mechanical modulator, (e.g., such as mechanical modulators 540a, 540b of FIG. 5 as described further below), could be used to move the first absorber 154a or the first source 152a relative to each other, and/or move the second absorber 154b or the second source 152b relative to each other. In another embodiment, the tuning mechanisms include a magnetic modulator, (e.g., such as a magnetic modulator 440 of FIG. 4 as described further below), could be used to generate a magnetic field around the first source 152a, the second source 152b, the first absorber 154a, or the second absorber 154b. It will be appreciated that tuning mechanism(s) are optional.

In one embodiment, the first and second absorbers 154a, 154b can be positioned at the first and third positions, respectively and generally face each other. The first and second sources 152a, 152b can be a single source positioned at the second position between the first and second absorbers 154a, 154b to generate two gamma radiations which can transmit in two directions to the first and second absorbers 154a, 154b, respectively. This configuration is further described with respect to FIG. 4 below.

In another embodiment, the first and second sources 152a, 152b can be positioned at the first and third positions, respectively and generally face each other. The first and second absorbers 154a, 154b can be a single absorber positioned at the second position, between the first and second sources 152a, 152b to absorb at least a portion of the gamma radiation from the first and second sources 152a, 152b, respectively, from generally opposite directions. This configuration is further described with respect to FIG. 5 below.

A detector, such as the detector 105, can be operatively connected to the absorber 154a to detect the absorption and generate one or more first signals associated with the first frequency shift. Another detector, such as the detector 105, can be operatively connected to the absorber 154b to detect the absorption and generate one or more second signals associated with the second frequency shift. It will be appreciated that one or more detectors can be operatively connected to one absorber, such as the absorber 154a, 154b.

The first and second signals can be received and processed by the processor 158. The first and second signals can be processed to reduce or cancel out systematic errors. One example of a systematic error may be a change in the performance of a detector due to a temperature change in a hot borehole environment. Since the possible systematic errors can include errors which are common to both the first signals and the second signals, the systematic errors can be reduced or canceled out by processing the first and second signals. In one embodiment, the two gamma radiations are along opposite directions and have a gravitational red shift (decreasing the frequency) and a gravitational blue shift (increasing the frequency), respectively. The systematic errors can affect the frequency shifts in the same way, e.g., deviating the measured frequency shifts in the direction from the correct frequency shifts. The gravitational red shift can be described as $(\Delta f_{red} + \delta_{sys})$, where $\Delta f_{red}$ is the correct gravitational red shift and $\delta_{sys}$ is the systematic error. The gravitational blue shift can be described as $(\Delta f_{blue} + \delta'_{sys})$, where $\Delta f_{blue}$ is the correct gravitational blue shift and $\delta'_{sys}$ is the systematic error. The systematic errors $\delta_{sys}$ and $\delta'_{sys}$ can be generally the same. In some embodiments, the gravitational red and blue shifts $\Delta f_{red}$ and $\Delta f_{blue}$ can have the same magnitude but opposite signs. The difference between the measured frequency shifts $[(\Delta f_{red} + \delta_{sys}) - (\Delta f_{blue} + \delta'_{sys})]$ can be used to determine the gravitational shift between the first and third positions by reducing or canceling out the systematic errors. The sum of the measured frequency shifts $[(\Delta f_{red} + \delta_{sys}) + (\Delta f_{blue} + \delta'_{sys})]$ can cancel the red shift against the blue shift, and can be used to determine the systematic errors. It will be appreciated that other appropriate methods, e.g., taking the ratio of the measured frequency shifts, can also be employed to determine the systematic errors.

Errors other than the systematic errors, such as random errors and design fluctuations in a component such as the component 160 can be quantitatively characterized in an appropriate calibration procedure and then reduced. In one embodiment, a gravimeter measurement can be performed twice: first in an upward mode and then in an upside-down mode. As discussed above, the systematic errors can affect the measurements in the upward mode and the upside-down mode in the same manner, regardless of orientation. For each mode, the sum of the gravitational red and blue shifts can cancel out the gravitational shifts and double the systematic error; the difference of the shifts can reduce or cancel out the systematic error and double the gravitational shifts. The comparison of the measurements of the two modes can be used as a calibration correction. For example, the difference between the measurements of the two modes can be attributed to second-order errors. The random fluctuation of the systematic errors due to manufacturing tolerances of individual components of gravimeters can also be determined from such comparison. This calibration measurement can provide a surface reference for a local gravitational gradient such as the free-air gradient. In another embodiment, gravimeter measurements can be performed in a horizontal direction where there is relatively no significant gradient to the gravitational potential. For example, the component such as the component 160 can be mounted on a float in a test tank to ensure a horizontal orientation. It will be appreciated that any combination of the above two calibration techniques and/or others can be applied.

Similar to the system 100, the system 100' can be used to determine a property of a geological formation including, for example, a density of the formation, and/or changes of the density over time. The system 100' can reduce systematic errors by using the tandem-structured gravimeter, such as the component 160.

Figure 2:
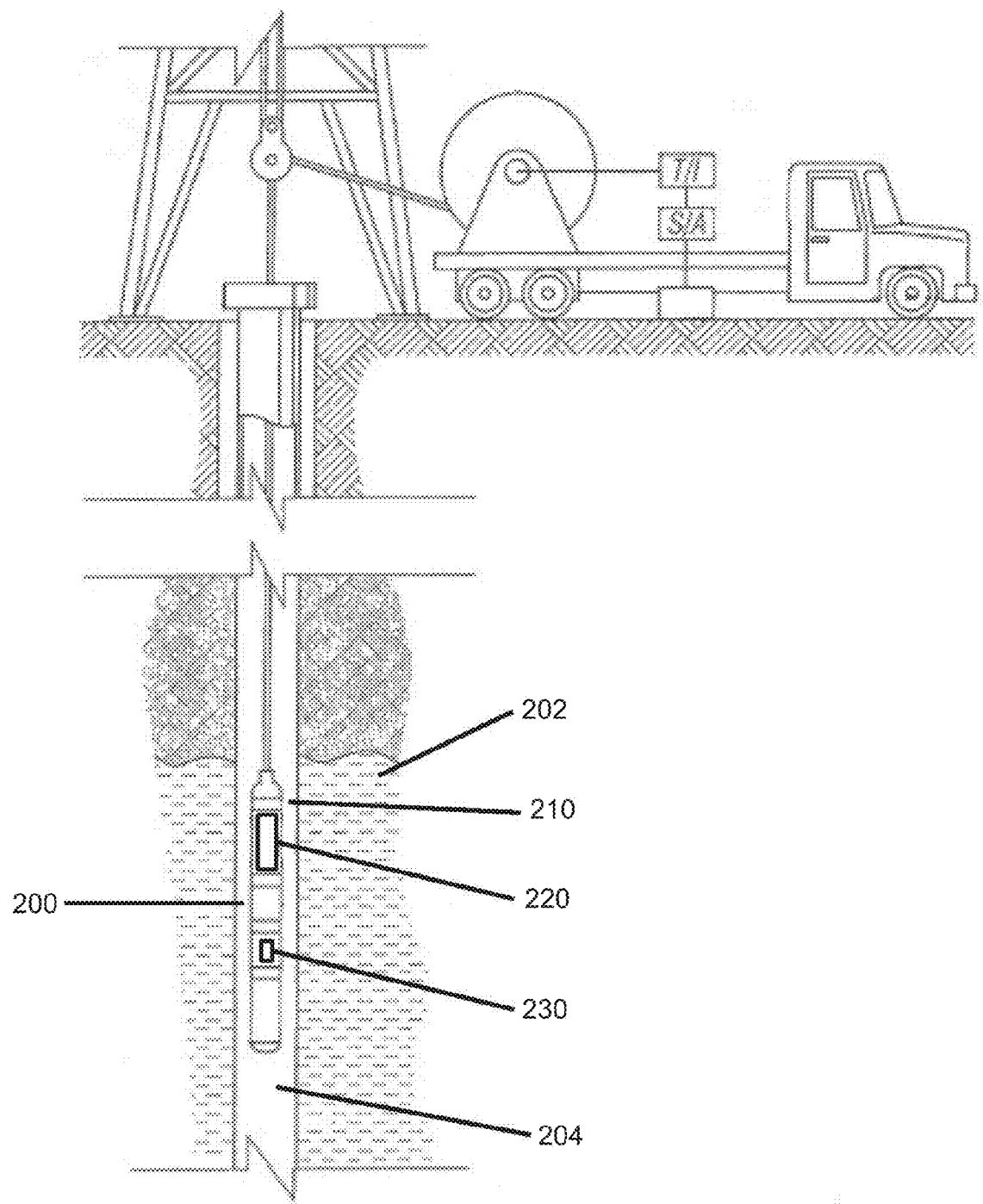
FIG. 2 illustrates a schematic diagram of one embodiment of a system described herein including an instrument, for example, a wireline tool suspended in a wellbore.
Figure 3:
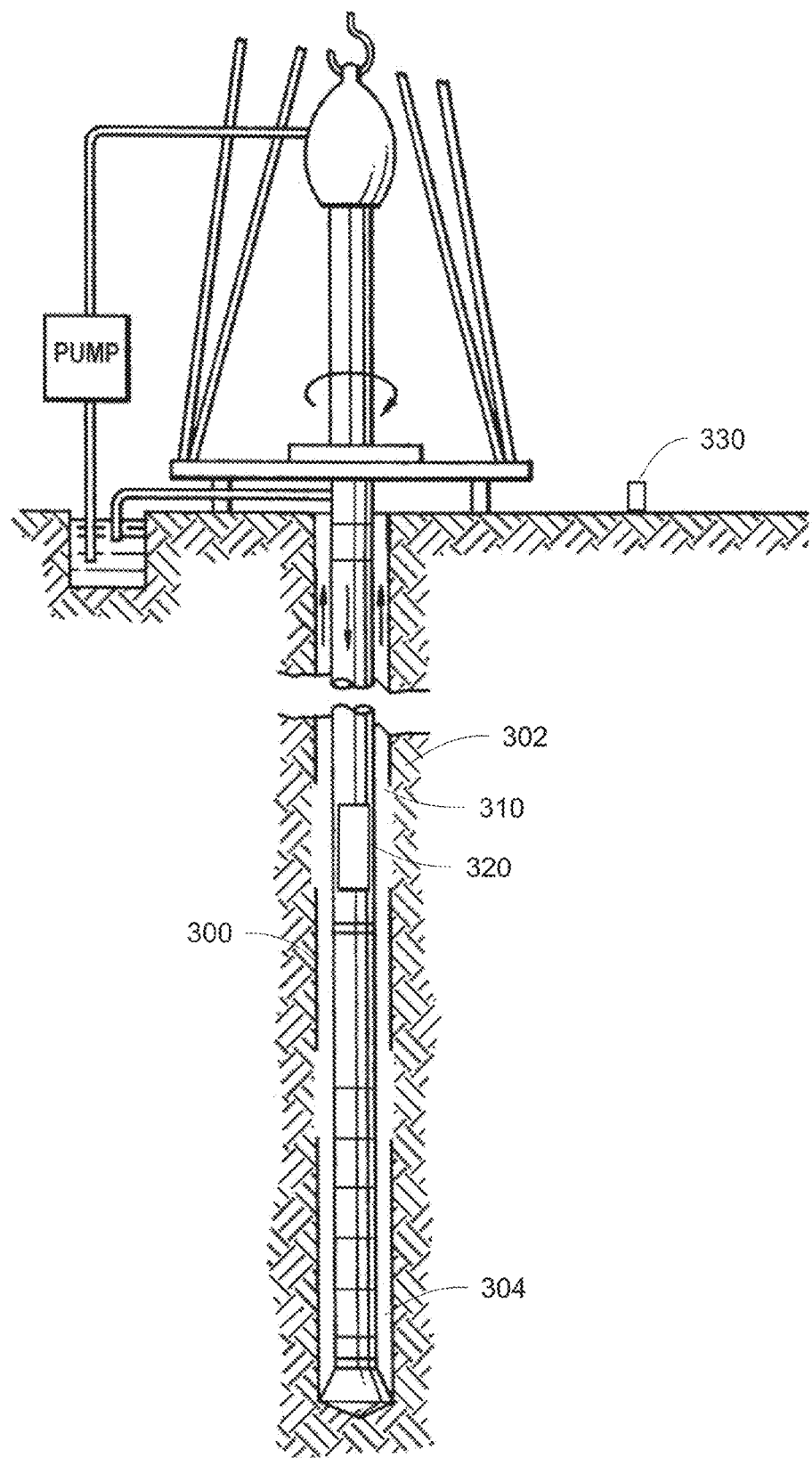
FIG. 3 illustrates a schematic diagram of one embodiment of another system described herein including an instrument, for example, a measurement-while-drilling (MWD) or logging-while-drilling (LWD) tool disposed in a wellbore.

FIGS. 2 and 3 illustrate implementations of systems, for example, in downhole tools. In some embodiments, a downhole tool can incorporate the system 100 of FIG. 1. In other embodiments, a downhole tool can itself be the system 100 of FIG. 1a and/or the system 100' of FIG. 1b. FIG. 2 illustrates a schematic diagram of one embodiment of a system 200 including a component 220 for determining a property of a geological formation 202. The system 200 can determine a gravitational potential difference between two positions of the geological formation 202 from a measured frequency shift of a radiation traveling between the two positions, based on the relationship described, for example, at Equation (3). A property of the geological formation 202 can be determined from the gravitational potential difference determined. For example, a density of the geological formation 202 can be derived from the gravitational potential difference, which will be discussed further below. It will be appreciated that other properties of the geological formation 202, for example, a formation compaction due to depletion, and/or changes in fluid composition of the geological formation such as changes in fluid composition from gas to water, may also be determined from the gravitational potential difference determined.

The system 200 includes an instrument 210 and a component 220 positioned within the instrument 210. The component 220 can be the component 110 of FIG. 1a, and/or the component 160 of FIG. 1b. In this embodiment, the instrument 210 can be a downhole tool, for example, a wireline tool that can be suspended in a wellbore 204. The wellbore 204 can be vertical, more or less deviated from vertical or even substantially horizontal. It is to be understood that the instrument 210 is not limited to a wireline tool and can be a measurement-while-drilling (MWD) tool, a logging-while-drilling (LWD) tool, a coiled tubing tool, a testing tool, a completions tool, a production tool, or combinations thereof, depending on the applications. For example, FIG. 3 illustrates a measurement-while-drilling/logging-while-drilling tool disposed in a wellbore which will be discussed below.

In one embodiment, as the downhole tool 210, runs over an extended depth interval, within the wellbore 204, the tool 210 may serve to identify and monitor density changes, possibly due to, for example, fluid fronts displacing gas or water encroaching in an asymmetrical fashion toward the depth interval. The extended depth interval refers to, for example, the thickness of a hydrocarbon reservoir, possibly several tens of meters, which can be much larger than a measurement interval of the tool 210. In one embodiment, the tool 210 can be used to determine within the extended depth interval the position of a formation-density change, for example, the change from the low-density gas zone to the high-density water zone below, where the interface can change for example from year to year, as gas is being produced-depleted.

A processor 230 is operatively connected to the component 220 for receiving/sending signal(s) from/to the component 220 and processing the signal(s). In this embodiment, the processor 230 is positioned within the downhole tool 210. In other embodiments, the processor 230 can be positioned outside of the downhole tool 210. For example, FIG. 3 illustrates a processor positioned above the wellbore, e.g., on the surface. It is to be understood that one or more processors can be used.

As shown in FIG. 2 (and also FIG. 3), the downhole tool 210/310 is positioned in a land based rig. It will be appreciated that the downhole tool 210/310 can also be deployed in other ways such as, for example, from an offshore platform.

FIG. 3 illustrates a schematic diagram of one embodiment of another system 300 including a component for determining properties of a geological formation. Similar to the system 200 shown in FIG. 2, the system 300 includes an instrument 310, e.g., a downhole tool, and a component 320 positioned within the instrument 310. The component 320 can be the component 110 of FIG. 1a, the component 160 of FIG. 1b or the component 220 of FIG. 2. In this embodiment, the instrument 310 is a downhole tool such as a measurement-while-drilling (MWD) or logging-while-drilling (LWD) tool that can be disposed in a wellbore 304.

A processor 330 is operatively connected to the component 320 for receiving/sending signal(s) from/to the component 320 and processing the signal(s). In this embodiment, the processor 330 is positioned on the surface. It will be appreciated that the processor 330 can be a part of the component 320 and/or on the downhole tool 310. It will be also appreciated that one or more processors can be used.

In the embodiments of FIGS. 2 and 3, the geological formation 202, 302 is a subterranean formation penetrated by the wellbore 204, 304. It will be appreciated that the geological formation 202, 302 does not have to be a subterranean formation. The system 200, 300 can be applied for other geological formations generally above and/or below the ground. For example, the geological formation 202, 302 can be a seafloor and the component 220, 320 can be positioned on the sea floor.

Figure 4:
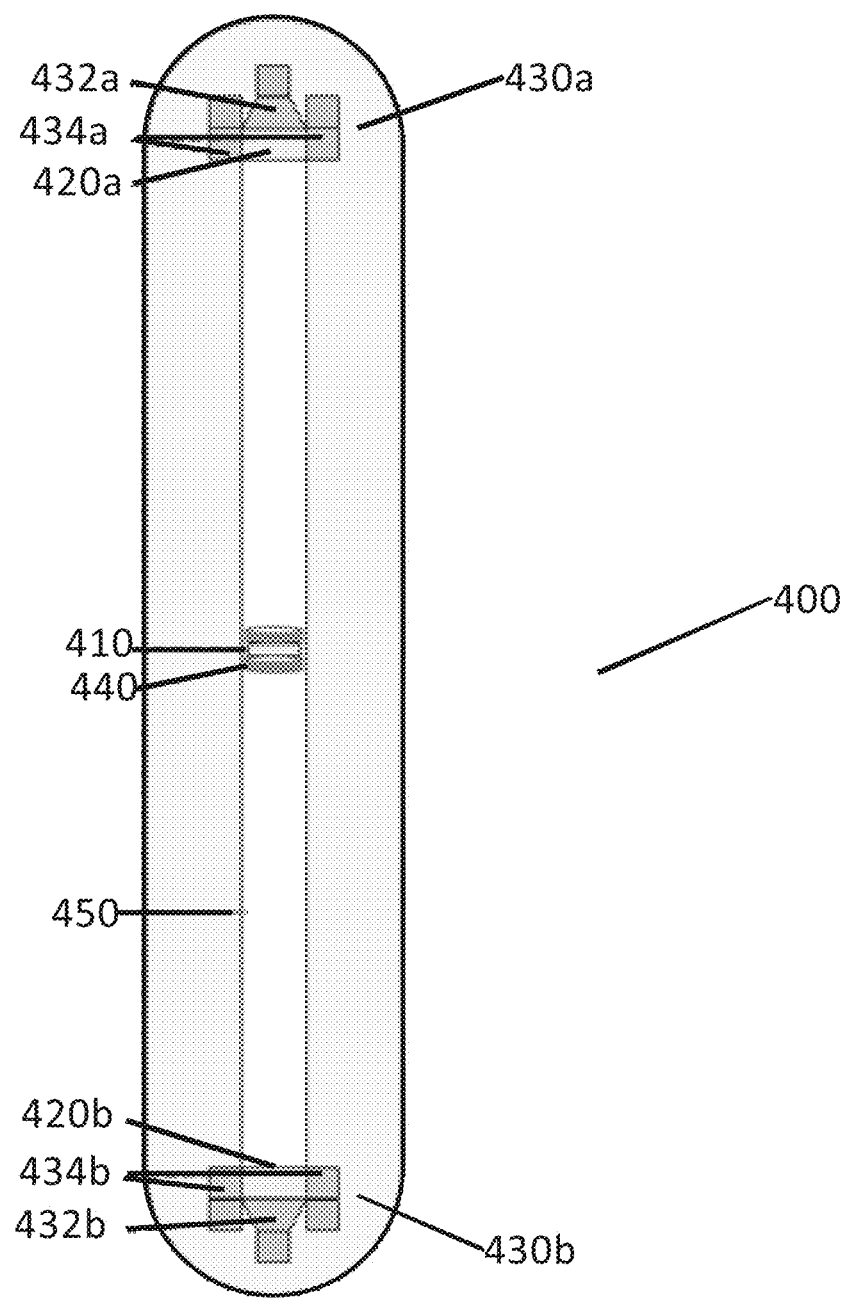
FIG. 4 illustrates a schematic diagram of an example component that includes a differential gravimeter described herein with a magnetic modulator for compensating the frequency shift of a radiation from a source.
Figure 5:
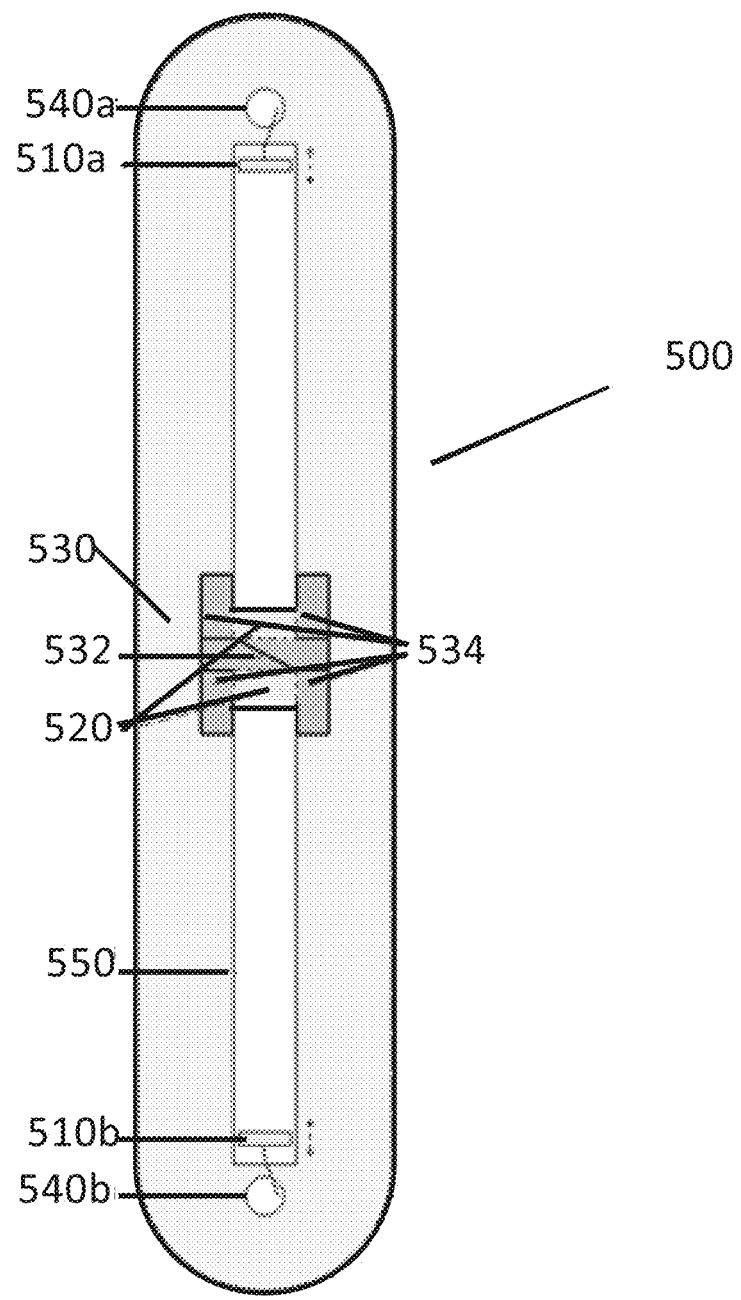
FIG. 5 illustrates a schematic diagram of another example component that includes a differential gravimeter described herein with a mechanical modulator for compensating the frequency shift of a radiation from a source.

FIGS. 4 and 5 illustrate examples of a component including a tandem-structured gravimeter for measuring a property of a geological formation. The gravimeter described herein applies Einstein's theory of gravitation for determining a gravitational potential difference between positions of a geological formation. Each differential gravimeter of FIGS. 4 and 5 can include a tandem arrangement, where systematic errors of a measurement process can be reduced. For example, the gravimeter of FIG. 4 can include two absorbers that are generally symmetrically arranged on opposite sides of a source. The gravimeter of FIG. 5 can include two sources that are generally symmetrically arranged on opposite sides of an absorber.

FIG. 4 illustrates a schematic diagram of one example of a component such as, for example, the component 160 of FIG. 1b. The example component includes a tandem-structured gravimeter described herein with a magnetic modulator for compensating the frequency shift of a radiation. The gravimeter 400 can be a part of the wireline tool of FIG. 2, or be a part of the measurement-while-drilling/logging-while-drilling tool of FIG. 3. It will be appreciated that the differential gravimeter 400 can be a part of other downhole tools, including a coiled tubing tool, a testing tool, a completions tool, a production tool, or combinations thereof, depending on specific applications. In one embodiment, the gravimeter 400 can be located above a resistivity tool that may be present on and may be a part of a downhole tool, such as in the downhole tool 210 of FIG. 2 or the downhole tool 310 of FIG. 3. Resistivity tools of downhole tools can be positioned at the bottom of a downhole tool and are known in the art.

The gravimeter 400 of FIG. 4 includes a source 410 mounted in a housing 450. The source 410 can generate a first gamma radiation toward a first direction and a second gamma radiation toward a generally opposite, second direction. The first and second gamma radiation can be aligned and oppositely oriented so that the systematic errors can be reduced or canceled out, as discussed above. Two absorbers 420a, 420b can be positioned opposite from the source 410 to receive at least a portion of the gamma radiation. In some embodiments, the source 410 and absorbers 420a, 420b can be aligned along a substantially straight line so that the first and second gamma radiations can form an angle around 180°. In one embodiment, the first gamma radiation can be emitted upwardly and the second gamma radiation can be emitted downwardly. It will be appreciated that the first and second gamma radiations can be emitted toward directions other than upward or downward. It will be also appreciated that the first gamma radiation and the second gamma radiation may not have to be positioned opposite with each other along a straight line.

The absorbers 420a, 420b can be respectively mounted at two ends of the housing 450, generally facing the source 410, to receive at least a portion of the radiation generated by the source 410. In the embodiment of FIG. 4, the distances from the source 410 to the respective absorbers 420a, 420b are generally the same. It will be appreciated that the distances do not have to be the same.

In one embodiment, the housing 450 is constructed as a tube to provide a line-of-sight contact between the source 410 and the absorber 420a, and between the source 410 and the absorber 420b. It will be appreciated that the source 410 and the absorbers 420a, 420b can be mounted at other positions of the housing as long as the radiation from the source 410 can be emitted to the absorbers 420a, 420b.

The source 410 and the absorbers 420a, 420b each can include at least one isotope, for example, $^{57}$Fe, $^{67}$Zn, $^{109}$Ag, $^{107}$Ag, $^{103}$Rh, and $^{189}$Os. In one embodiment, the source 410 and the absorbers 420a, 420b include the same type of isotope. The isotope can be in the form of, for example, a crystal plate which can serve as a whole to absorb recoil from photons emitted. It will be appreciated that the isotope may be in other suitable forms. For example, the source 410 and the absorbers 420a, 420b can use a metal slice made out of an isotope or a suitable alloy in which an isotope is embedded in a metal-crystal structure so that the metal slice or the alloy can serve as an entire bulk to absorb the emission-recoil energy. In some embodiments, the source 410 and the absorbers 420a, 420b can include single crystal(s) thermally diffused with isotope(s), metal foil(s) enriched with isotope(s), and/or crystal powders containing isotope(s).

The source 410 can generate radiation, for example, gamma radiation, at a desired narrow spectral line. It will be appreciated that the radiation could come from a variety of sources. For example, Table 1 above lists examples of natural line width for spectral lines emitted by example nuclear isotopes. It is to be understood that the line width of gamma radiation is not limited to the listed line widths of Table 1. In other embodiments, radiations having frequency/energy that may be different from gamma radiation may be used as long as the radiation can be comparable to that of a gamma radiation, for example, having a spectral line width such as the natural line widths listed in Table 1.

The first and second gamma radiations from the source 410 are emitted to the absorbers 420a, 420b, respectively, which can absorb the gamma radiation. In one embodiment, the housing 450 can include a tube filled with transmission media to reduce radiation absorption before the gamma radiation arrives at the absorbers 420a, 420b. For example, light gases such as for example helium can be used as transmission media to remove relatively heavy elements such as for example argon. In another embodiment, the space between the source 410 and the absorbers 420a, 420b can be in a vacuum to reduce radiation absorption during transmission.

The absorbers 420a, 420b each can be operatively connected to a detector to detect the absorption of gamma radiation. A first detector can be operatively connected to the absorber 420a and a second detector can be operatively connected to the absorber 420b. It will be appreciated that one or more detectors may be employed for each of the absorbers 420a, 420b. In one embodiment, the first detector is constructed as first detector assembly 430a that includes a transmission detector, such as the transmission detector 432a of FIG. 4. The second detector is constructed as second detector assembly 430b that includes a transmission detector, such as the transmission detector 432b of FIG. 4. In another embodiment, the detector assemblies 430a, 430b each can include the transmission detector 432a, 432b and a side-scatter detector, such as the side-scatter detector 434a, 434b of FIG. 4. In other embodiments, side-scatter detector(s) may not be employed. It will be appreciated that the detector assemblies, 430a, 430b, can include one or more transmission detectors and/or one or more side-scatter detectors in any suitable combinations.

In the embodiment of FIG. 4, the transmission detector 432a, 432b can be positioned in a forward direction, behind the respective absorbers 420a, 420b relative to the source 410, to detect reduced photon flux or a diminishing of the gamma radiation due to the absorption by the respective absorbers 420a, 420b. The forward direction described herein refers to the direction of radiation travelling from a source to an absorber. In some embodiments, with the absorption of the gamma radiation, the absorbers 420a, 420b each can re-emit photons, which can be detected away from the forward direction by a side-scatter detector, such as the side-scatter detectors 434a, 434b. In this embodiment, two side-scatter detectors 434a, 434b are positioned on each side of the respective absorbers 420a, 420b. It is to be understood that one or more side-scatter detectors can be positioned, for example, on one side of the absorbers 420a, 420b. In another embodiment, the absorption can be detected by one or more transmission detectors without using a side-scatter detector. The transmission detector and the side-scatter detector can include, for example, a scintillation crystal coupled to a photomultiplier tube, and/or a solid-state detector such as for photons.

The first and second gamma radiations generated by the source 410 travel from the source 410 to the absorbers 420a, 420b, respectively. The first gamma radiation can have a first frequency shift due to a first gravitational potential difference between the positions of the source 410 and the absorber 420a. The second gamma radiation can have a second frequency shift due to a second gravitational potential difference between the positions of the source 410 and the absorber 420b. For example, if the source 410 and the absorbers 420a, 420b are in positions with different gravitational potential, they encounter different time dilatation. Their respective gamma radiation, for example, spectral lines, are slightly frequency shifted with each other, and there would be relatively less resonant absorption and/or re-emission compared to the situation without such frequency shift. In some embodiments, the gravitational potential may change proportionally to the distance between the source and the absorber. The rate of the change can be a constant. The rate itself may change which can be related to high-order, e.g., quadratic, cubic, or higher order, of corrections.

In the embodiment of FIG. 4, the first gamma radiation can be emitted upwardly from the source 410 to the absorber 420a, which can have a red shift. The second gamma radiation can be emitted downwardly from the source 410 to the absorber 420b and can have a blue shift. It will be appreciated that the gamma radiations emitted to the absorber 420a, 420b can be in directions other than upward or downward. In some embodiments, the housing 400 can be tilted at a desired angle with respect to a gravitational vertical such that the first and/or second gamma radiations travelling from the source(s) to the respective absorber(s) can form a tilt angle with respect to the gravitational vertical. The tilt angle can vary, for example, from 0 to 180 degree. It is to be understood that the first and second gamma radiation travelling from the source(s) to the respective absorber(s) can form substantially the same tilt angle with respect to the gravitational vertical. It will be appreciated that the gamma radiation can be emitted equally or non-equally in all directions from the source, and the absorber can absorb a portion of the gamma radiation in the direction along which the source and the absorber are aligned.

The frequency shift, such as the red shift for the first gamma radiation and the blue shift for the second gamma radiation in FIG. 4, can be compensated by a tuning mechanism, such as a magnetic modulator 440 of FIG. 4, and/or mechanical modulators 540a, 540b of FIG. 5 as described further below. It will be appreciated that the use of a tuning mechanism is optional.

In this embodiment, the magnetic modulator 440 includes a magnetic field coil that can be operatively connected to the source 410 to generate external magnetic field(s). The external magnetic field(s) generated can help compensate the frequency shift of the first gamma radiation and the frequency shift of the second gamma radiation emitted from the source 410 by tuning them. In the embodiment of FIG. 4, the magnetic modulator 440 can blue-shift the frequency of the first gamma radiation to compensate the red shift resulted from the gravitational potential difference between the source 410 and the absorber 420a, and red-shift the frequency of the second gamma radiation to compensate the blue shift resulted from the gravitational potential difference between the source 410 and the absorber 420b, such that the first and second gamma radiation can be resonantly absorbed by the absorbers 420a, 420b, respectively.

In some embodiments, the external magnetic field(s) can shift the spectral frequency of gamma radiation using the quantum-mechanical effect of Zeeman splitting, where interaction energies of the couplings between the nuclear magnetic moments of isotope atoms and the external magnetic field(s) can be modulated. Such magnetic modulation can split a spectral line into multiple energy sub-levels and allow the energy difference of the magnetic splittings to account for the gravitational frequency shift so photons can be resonantly absorbed. The effect of Zeeman splitting is known and not further described.

Such external magnetic field(s) generated by the magnetic modulator 410 can be controlled to tune the frequency of the gamma radiation without moving the source or the absorber. In one embodiment, the magnetic field(s) can be generated, for example, inside a solenoidal coil around a source by an electric current. The intensity of the electric current can determine the magnetic-field strength. The electric current can be controlled to have a relative precision of, for example, one part in 1000 or better. For example, a 1 mA current can be controlled with a precision of ±1 µA or better.

The magnetic field(s) can include a superposition of two components, e.g., a baseline component and an oscillating component. The baseline component can be a substantially constant field that can impose a bias to shift a spectral line of the radiation by a determined amount against a zero-field reference. In one embodiment, the baseline component can cause a splitting of a spectral line by coupling nuclear magnetic moments to electron magnetic moments. The baseline component can be, for example, a few hundred Gauss or milli-Tesla. It will be appreciated that the baseline component of other magnitudes can be used to split the spectral line.

The baseline component can serve to compensate for a majority of the frequency shift due to the gravitational potential difference between the positions of a source and an absorber, such as the source 410 and the absorbers 420a, 420b. For example, if the position of the source has a lower gravitational potential than the position of the absorber, the source has a red shift in terms of frequency. A magnetic modulator, such as the magnetic modulator 440, can be operatively connected to the source 410 such that a constant baseline component of a magnetic field generated can shift the frequency of the radiation from the source upward.

The gravitational potential difference may depend on a tilt angle of the gravimeter against a gravitational vertical. To compensate the frequency shift, the baseline component can be adjustable according to the tilt angle of the gravimeter against the gravitational vertical. In one embodiment, the tilt angle can be measured by a tilt meter, for example, a triaxial accelerometer, which can determine the angle within a resolution of, for example, about 0.1 degree or better. It will be appreciated that the tilt angle can be measured by a tilt meter other than a triaxial accelerometer. A processor operatively connected to the gravimeter 500, such as the processor 158 of FIG. 1b, can have a module such as the module 158a shown in FIG. 1b to determine a dependence of the baseline component on the tilt angle.

The oscillating component of the magnetic field can then sweep the spectral line of the radiation over a frequency range to compare the source and absorber spectral resonance frequencies. The oscillating component may be considerably weaker than the baseline component. For example, the oscillating component may have the amplitude of a few percent of the baseline component. The frequency of the oscillating component can be determined based on a given source, such as the source 410, and/or a given absorber, such as the absorber 420. For example, the frequency of the oscillating component can be around 10-100 MHz for $^{57}$Fe, and around 10-100 kHz for $^{67}$Zn. The oscillating component may follow a shaped pulse, for example, a triangular or saw-tooth pulse that can linearly sweep the spectral frequency of the source and/or the resonant spectral frequency of the absorber so as to compare the frequencies of the source and the absorber. It will be appreciated that pulses other than triangular or saw-tooth shaped can also be used.

Some sources, e.g., $^{109}$Ag, can emit gamma radiation having such a narrow line width that the Earth's magnetic field can split the spectral line of gamma radiation into components. Some sources, e.g., $^{57}$Fe and $^{67}$Zn, have relatively wider line width that the Earth's magnetic field can broaden the spectral line. In some embodiments, the magnetic modulator 440 may generate a magnetic field having a component to compensate for an Earth's magnetic field. For example, the magnetic modulator 440 may include magnetic coil(s) to compensate for a component of the Earth's magnetic field, e.g., in line with an axis of a gravimeter. In one embodiment, the Earth's magnetic field is measured as a three-component vector at a well site by a triaxial magnetometer. The Earth's magnetic field can be assumed to be valid in a volume around the well site that includes multiple wells drilled from the well site. A relevant magnetic field component can be in line with an axis of a gravimeter.

In one embodiment, the magnetic modulator 440 is operatively connected to the source 410 such that the magnetic field(s) generated can be around the source 410. In other embodiments, the absorbers 420a, 420b each can be operatively connected to a magnetic modulator such as the magnetic modulator 440 such that the magnetic field(s) generated can be around the absorbers 420a, 420b, respectively, to tune resonance frequencies of the respective absorbers so that the gamma radiations from the source 410 can be resonantly absorbed by the respective absorbers. In some embodiments, the baseline component and the oscillating component may be decoupled and separately installed around either the source 410 and/or the absorbers 420a, 420b.

FIG. 5 illustrates a schematic diagram of another example of a tandem-structured gravimeter described herein. The tandem-structured gravimeter 500 can include first and second sources 510a, 510b, an absorber 520, and a detector assembly 530 including a transmission detector 532 and a side-scatter detector(s) 534, which can be contained in a housing 550. The structure and function of the differential gravimeter 500 can be similar to the gravimeter 400 of FIG. 4, except, for example, that the gravimeter of FIG. 5 can include two sources that are generally symmetrically arranged on opposite sides of an absorber.

In the embodiment of FIG. 5, two sources 510a, 510b can be respectively mounted proximate toward two ends of the housing 550, each generally facing the absorber 520, to generate radiation, for example, gamma radiation toward the absorber 520. The source 510a can generate a first gamma radiation emitted downwardly toward the absorber 520. The source 510b can generate a second gamma radiation emitted upwardly toward the absorber 520. The absorber 520 can be positioned between the sources 510a, 510b, to receive at least a portion of the first gamma radiation from the first direction and receive at least a portion of the second gamma radiation from the second direction.

In one embodiment, the housing 550 can be similar as the housing 450 to provide a line-of-sight contact between the source 510a and the absorber 520, and between the source 510b and the absorber 520. It will be appreciated that the absorber 520 and the sources 510a, 510b can be mounted at other positions of the housing as long as the radiation from the sources 510a, 510b can be emitted to the absorber 520, respectively. In the embodiment of FIG. 5, the absorber 520 includes two separate, co-located absorbers: a first absorber to receive the gamma radiation emitted from the source 510a, and a second absorber to receive the gamma radiation emitted from the source 510b. It would be appreciated that the absorber 520 can be a single absorber that includes two portions, for example, positioned back-to-back, facing their respective sources to receive gamma radiation. The absorber(s) can be operatively connected to one or more detectors.

In the embodiment of FIG. 5, the first gamma radiation is emitted downwardly from the source 510a to the absorber 520, which can have a blue shift. The second gamma radiation is emitted upwardly from the source 510b to the absorber 520, which can have a red shift.

Similar to the gravimeter 400 of FIG. 4, the frequency shift in the gravimeter 500 in FIG. 5, can be compensated by a tuning mechanism, such as the magnetic modulator 440 of FIG. 4. FIG. 5 shows mechanical modulators 540a, 540b rather than a magnetic modulator, such that the first radiation from the source 510a and the second radiation from the source 510b can be resonantly absorbed by the absorber 520, respectively. In one embodiment, the sources 510a, 510b each can be operatively connected to mechanical modulator 540a, 540b, respectively, so that the sources 510a, 510b can move relative to the absorber 520. The mechanical modulator

540a can be operatively connected to the source 510a and the mechanical modulator 540b can be operatively connected to the source 510b. The movement of the respective source 510a, 510b relative to the absorber 520 can generate a frequency shift of the respective first or second gamma radiation emitted from the sources 510a, 510b. In the embodiment of FIG. 5, the distances from the absorber 530 to the respective sources 520a, 520b are generally the same. It will be appreciated that the distances do not have to be the same.

In one embodiment, frequency shift can be a Doppler shift which can be used to compensate the frequency shift due to the gravitational potential difference. Here, Doppler shift refers to, for example, a change in frequency of a wave for an object moving relative to the source of the wave. For example, relative movements between a source and an absorber generate a Doppler shift, where the frequency of radiation emitted from the source or received by the absorber can be changed.

In the embodiment of FIG. 5, the sources 510a, 510b can be respectively mounted on a platform and driven by a piston having an eccentered wheel. It will be appreciated that the modulators 540a, 540b are not limited to the specific structure of FIG. 5 and other types of modulators that can generate relative movements between the respective source 510a, 510b and the absorber 520 sufficient to induce a shift (e.g., Doppler shift) in gamma radiation frequency may be used. The relative velocity can be, for example, in a range from nm/s to mm/s. It will be appreciated that the relative velocity may vary according to the natural line widths of the isotopes of the sources 510a, 510b and/or the absorber 520. It will be appreciated that the relative movements between the source and absorber can be generated by various means. For example, a permanent magnet inside a solenoidal coil driven with an alternating current can also be used as a mechanical modulator.

The source 510a, 510b or the absorber 520 can be moved, for example, in an oscillatory manner toward and away from each other. This movement causes a shift (e.g., Doppler shift) in photon energy and frequency. Oscillation speeds in a range, for example, 10 nm/second to 10 mm/second, can be sufficient to sweep the emitted and resonantly absorbed spectral lines past each other. It will be appreciated that other oscillation speeds may be suitable.

In some embodiments, a tuning mechanism, such as the magnetic modulator 440, and/or the mechanical modulator 540a, 540b, can be operatively connected to the absorber 520 to tune a resonance frequency of the absorber 520 so that the first radiation from the source 510a and the second radiation from the source 520a can be resonantly absorbed by the absorber 520, respectively. For example, one of the mechanical modulators 540a, 540b can be operatively connected to the absorber 520 to move the absorber 520 relative to the source 510a, 510b to generate a shift (e.g., Doppler shift) so that the frequency shift of the radiation due to the gravitational potential difference can be compensated.

The differential gravimeter described herein can measure a gravitational potential, which is scalar, different from a vector-valued gravitational force. The differential gravimeter described herein may not have to be aligned with a direction of gravity. For example, the differential gravimeter described herein may be used in a deviated or horizontal wellbore to monitor density changes in a geological formation, such as lateral fluid fronts replacing gas or water.

Figure 6:
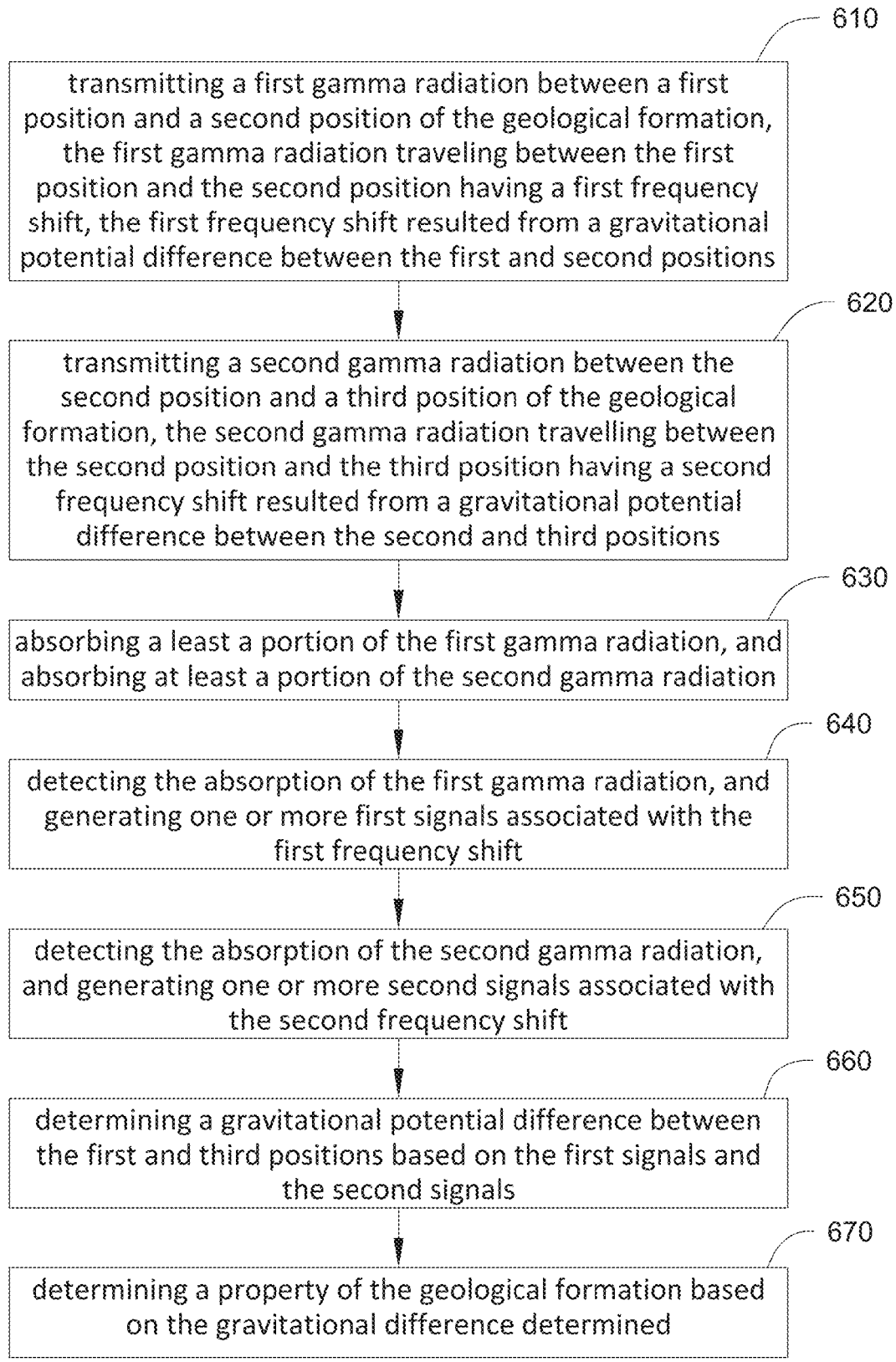
FIG. 6 illustrates a flow diagram of one embodiment for determining a property of a geological formation.

FIG. 6 illustrates a flow diagram of an example method for determining a property of a geological formation. It will be appreciated that the method of FIG. 6 can be implemented in any system and/or component described in FIGS. 1-5.

At block 610, a first gamma radiation transmits between a first position and a second position of a geological formation. The first gamma radiation can be generated by a source, for example, the sources 152a, 152b of FIG. 1b, the source 410 of FIG. 4, and/or the sources 510a, 510b of FIG. 5. The first gamma radiation travelling between the first position and the second position can have a first frequency shift, which can be resulted from a gravitational potential difference between the first and second positions.

At block 620, a second gamma radiation transmits between the second position and a third position of a geological formation. The second gamma radiation can be generated by a source, for example, the source 104 of FIG. 1a, the sources 152a, 152b of FIG. 1b, the source 410 of FIG. 4, and/or the sources 510a, 510b of FIG. 5. The second gamma radiation travelling between the second position and the third position can have a second frequency shift, which can be resulted from a gravitational potential difference between the second and third positions.

At block 630, at least a portion of the first gamma radiation generated by the source is absorbed with an absorber, such as the absorber 154a, 154b, 420a, 420b, 520. At least a portion of the second gamma radiation generated by the source is absorbed with an absorber, such as the absorber 154a, 154b, 420a, 420b, 520. In one embodiment, the first frequency shift of the first gamma radiation and the second frequency shift of the second gamma radiation can be respectively compensated by a tuning mechanism such as the tuning mechanism 106, 440, 540a, 540b so that the first gamma radiation can be resonantly absorbed by the absorber. It will be appreciated that one or more tuning mechanisms can be used.

At block 640, the absorption of the first gamma radiation is detected by a detector, such as the detector assemblies 430a, 430b, 530. In one embodiment, a diminishing of radiation intensity can be detected with a transmission detector such as the transmission detector 432a, 432b, 532, for example, by detecting a reduced photon flux in a forward direction after the first gamma radiation absorbed by an absorber, such as the absorber 420a, 420b, 520. The detector generates first signal(s) associated with the first frequency shift due to the gravitational potential difference between the first position and the second position. It will be appreciated that one or more detectors can be used.

At block 650, the absorption of the second gamma radiation is detected by a detector, such as the detector 105, and/or assemblies 430a, 430b, 530. In one embodiment, a diminishing of radiation intensity can be detected with a transmission detector such as the transmission detector 432a, 432b, 532, for example, by detecting a reduced photon flux in a forward direction after the second gamma radiation absorbed by an absorber, such as the absorbers 420a, 420b, 520. The detector generates second signal(s) associated with the second frequency shift due to the gravitational potential difference between the second position and the third position. It will be appreciated that one or more detectors can be used.

At block 660, the gravitational potential difference between the first and third positions can be determined by a processor, such as the processor 108, 158, 230, 330 from the first and second signals generated by the detectors. In some embodiments, the first/second signal(s) can be processed to determine the first/second frequency shift and the gravitational potential difference between the first and third positions can be determined based on the first and second frequency shifts determined. It is to be understood that one or more processors can be used to determine the gravitational potential difference between the first and third positions. In one embodiment, possible systematic errors common to both the first signals and the second signals, can be reduced or canceled out by processing the first and second signals, for example, by determining the frequency shifts from the signals and taking the difference of the first and second frequency shifts determined from the first and second signals, as discussed above. It will be appreciated that the processing method may be varied to reduce possible systematic errors, by considering factors such as orientations of the respective first and second gamma radiations with respect to a gravitational vertical, the distance between the first and second positions, and/or the distance between the second and third positions.

At block 670, the processor can determine a property of the geological formation from the gravitational potential difference determined. For example, a formation density of geological formation can be determined from the gravitational potential difference. The conversion from a gravitational potential difference determined to a density of a geological formation can be achieved by a method, such as by a concentric spherical shell model, as described further below. It will be appreciated that properties other than the density of the formation, such as changes of fluid compositions can be determined.

Figure 7:
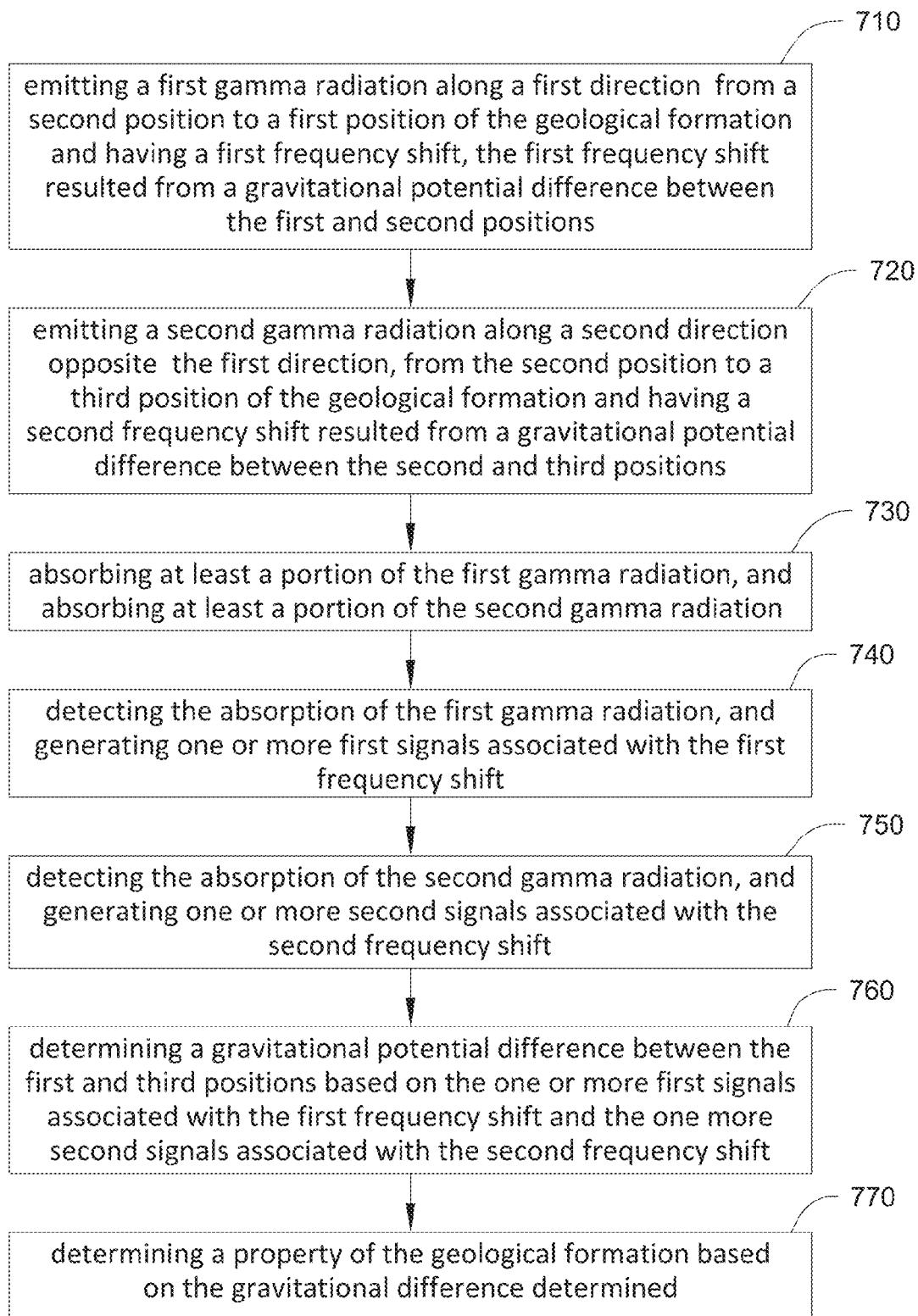
FIG. 7 illustrates a flow diagram of another embodiment for determining a property of a geological formation.

FIG. 7 illustrates a flow diagram of another example method for determining a property of a geological formation. FIG. 7 shows one method of implementing the gravimeter of FIG. 4. It will be appreciated that the method of FIG. 7 can be implemented in any system and/or component described in FIGS. 1-4.

At block 710, a first gamma radiation is emitted along a first direction from a second position to a first position of a geological formation. The first gamma radiation can be generated by a source, for example, the sources 152a, 152b of FIG. 1b, and/or the source 410 of FIG. 4, at the second position. The first gamma radiation travelling from the second position to the first position can have a first frequency shift, which can be resulted from a gravitational potential difference between the first and second positions.

At block 720, a second gamma radiation is emitted along a second direction generally opposite the first direction, from the second position to a third position of the geological formation. The second gamma radiation can be generated by the source at the second position. The second gamma radiation travelling from the second position to the third position can have a second frequency shift, which can be resulted from a gravitational potential difference between the second and third positions.

At block 730, at least a portion of the first gamma radiation generated by the source is absorbed with a first absorber, such as the absorber 104, 154a, 154b, 420a, 420b, at the first position. At least a portion of the second gamma radiation generated by the source is absorbed with a second absorber, such as the absorber 104, 154a, 154b, 420a, 420b, as the third position. In one embodiment, the first frequency shift of the first gamma radiation and the second frequency shift of the second gamma radiation can be respectively compensated by a tuning mechanism such as the tuning mechanism 106, 440, 540a, 540b, such that the first gamma radiation can be resonantly absorbed by the respective absorbers.

At block 740, the absorption of the first gamma radiation is detected by a first detector, such as the detectors 105, and/or assemblies 430a, 430b. In one embodiment, a diminishing of radiation intensity can be detected with a transmission detector such as the transmission detector 432a, 432b, for example, by detecting a reduced photon flux in a forward direction after the first gamma radiation absorbed by an absorber, such as the absorber 420a, 420b. In addition, photons re-emitted by an absorber upon the absorption can be detected away from the forward direction such as the side-scatter detectors 432a, 432b. The detector generates first signal(s) associated with the first frequency shift due to the gravitational potential difference between the first position and the second position.

At block 750, the absorption of the second gamma radiation is detected by a second detector, such as the detector assembly 430a, 430b. In one embodiment, a diminishing of radiation intensity can be detected with a transmission detector such as the transmission detector 432a, 432b, for example, by detecting a reduced photon flux in a forward direction after the second gamma radiation absorbed by an absorber, such as the absorber 420a, 420b. In addition, photons re-emitted by an absorber upon the absorption can be detected away from the forward direction by one or more side-scatter detectors, such as the side-scatter detector 434a, 434b. The detector generates second signal(s) associated with the second frequency shift due to the gravitational potential difference between the second position and the third position.

At block 760, the gravitational potential difference between the first and third positions can be determined by a processor, such as the processor 158, 230, 330 from the first and second signals generated by the detectors. In some embodiments, the first/second signal(s) can be processed to determine the first/second frequency shift and the gravitational potential difference between the first and third positions can be determined based on the first and second frequency shifts determined. It is to be understood that one or more processors can be used to determine the gravitational potential difference between the first and third positions. In one embodiment, similar to the block 660, possible systematic errors common to both the first signals and the second signals, can be reduced or canceled out by processing the first and second signals. It will be appreciated that the processing method may be varied to reduce possible systematic errors, by considering factors such as orientations of the respective first and second gamma radiations with respect to a gravitational vertical, the distance between the first and second positions, and/or the distance between the second and third positions.

At block 770, similar to the block 670, the processor can determine a property of the geological formation from the gravitational potential difference determined. For example, a formation density of geological formation can be determined from the gravitational potential difference. The conversion from a gravitational potential difference determined to a density of a geological formation can be achieved by a method, such as by a concentric spherical shell model, as described further below. It will be appreciated that properties other than the density of the formation, such as changes of fluid compositions can be determined.

Figure 8:
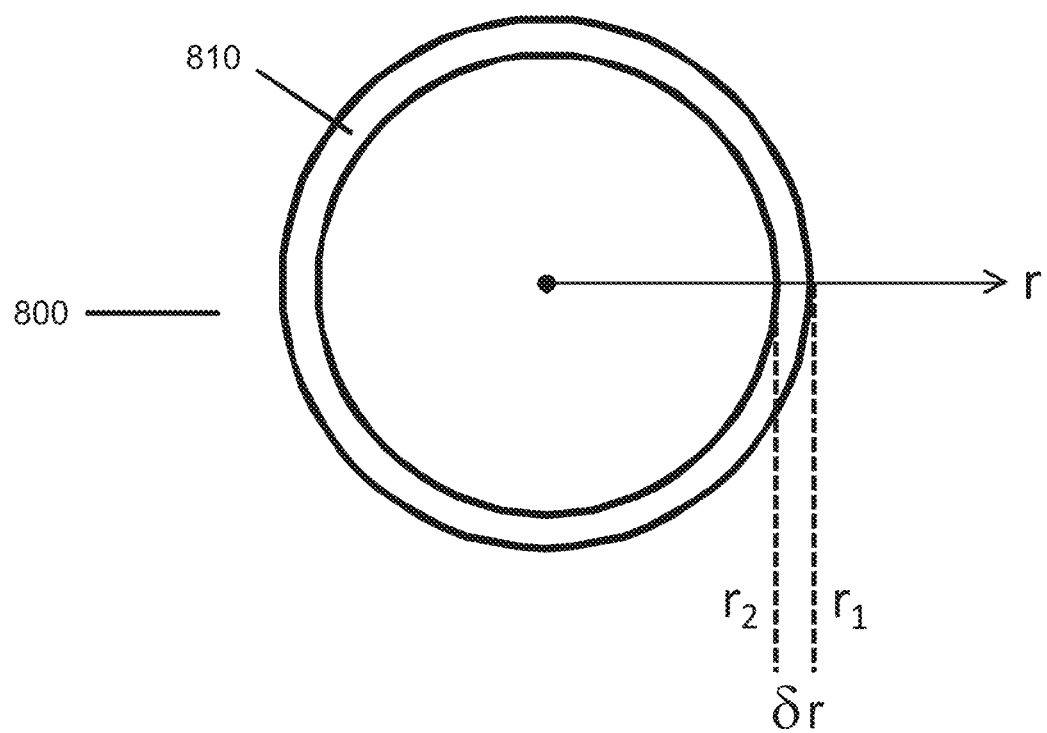
FIG. 8 illustrates a schematic diagram of an example of a concentric spherical shell model.

FIG. 8 illustrates a schematic diagram of an example concentric spherical shell model for determining a density of a geological formation from a gravitational potential difference determined. In the concentric spherical shell earth model, the earth can be represented by a generally spherical body 800 having concentric shells, e.g., the concentric shell 810. Equation (4) gives the mass contribution dm of a concentric shell at radius r as:

$$dm = 4\pi r^2 \rho(r) dr \quad (4)$$

where $\rho(r)$ is a density at radius r. The total mass m of the sphere out to a radius $r_0$ is:

$$m(r_0) = 4\pi \int_0^{r_0} r^2 \rho(r) dr \quad (5)$$

This mass $m(r_0)$ gives a gravitational potential $\Phi(r_0)$ up to an arbitrary constant C:

$$\Phi(r_0) = \frac{Gm(r_0)}{r_0} + C \qquad (6)$$

where G is the gravitational constant.

Between two radii $r_1$ and $r_2$ (with $r_1 > r_2$) the difference in the gravitational potential is:

$$\Phi(r_1) - \Phi(r_2) = \frac{Gm(r_1)}{r_1} - \frac{Gm(r_2)}{r_2} \qquad (7)$$

$$= 4\pi G \left( \frac{1}{r_1} \int_0^{r_1} r^2 \rho(r) dr - \frac{1}{r_2} \int_0^{r_2} r^2 \rho(r) dr \right)$$

The concentric spherical shell model may assume that between two close-by radii the density is generally a constant, corresponding to an average density $\rho_{ave}$. The gravitational potential difference in Equation (7) can be simplified to:

$$\Phi(r_1) - \Phi(r_2) = 4\pi G \left( \left( \frac{1}{r_1} - \frac{2}{r_2} \right) \int_0^{r_2} r^2 \rho(r) dr + \frac{\rho_{ave}}{r_1} \int_{r_2}^{r_1} r^2 dr \right) \qquad (8)$$

$$= \frac{4\pi G \rho_{ave}}{3 r_1} (r_1^3 - r_2^3) - 4\pi Gm(r_2) \frac{r_1 - r_2}{r_1 r_2}$$

The second term $$4\pi Gm(r_2) \frac{r_1 - r_2}{r_1 r_2}$$

is a free-air gradient in terms of the gravitational potential. It will be appreciated that a free-air gradient for Newton-gravimetry force measurements has a different formula.

The vertical distance $\delta r = r_1 - r_2$ can be between positions of, for example, a source and an absorber such as the source 410, 510 and the absorber 420, 520, which in some examples may be the source-absorber distance at a single log station in a vertical well. In a non-vertical well, the vertical distance for example can be the source-absorber distance multiplied by the cosine of a dip angle, e.g., a deviation angle from the vertical direction. The vertical distance $\delta r$ can be much smaller than the earth radius R. For example, the vertical distance $\delta r$ can be around several meters or less, e.g., about 1 to about 2 meters.

For an example application of the concentric spherical shell model on a differential gravimeter, such as the differential gravimeter 400, 500, and/or the differential gravimeter in the component 110, to determine a density of a geological formation from a determined gravitational potential difference, the vertical distance $\delta r$ can be determined as a vertical distance between a source and an absorber, for example, a vertical distance between the source 410 and the absorber 420, or a vertical distance between the source 510 and the absorber 520. It is to be understood that the vertical distance depends on an orientation of the differential gravimeter. For example, a differential gravimeter can be in a non-vertical orientation where the vertical distance between the source and the absorber therein can be determined based on the non-vertical orientation.

With $r_1 = r_2 + \delta r = r + \delta r$, the gravitational potential difference can become:

$$\Phi(r_1) - \Phi(r_2) = \frac{4\pi G \rho_{ave}}{3r} \left( \begin{array}{c} (r+\delta r)^2 + \\ (r+\delta r)r + r^2 \end{array} \right) \delta r - 4\pi Gm(r_2) \frac{\delta r}{r^2} \qquad (9)$$

$$\cong 4\pi G \rho_{ave} r \delta r - 4\pi Gm(r) \frac{\delta r}{r^2}$$

An average formation density $\rho_{ave}$ between the radii $r_1$ and $r_2$ can be determined from the gravitational potential difference $\delta\Phi(r) = \Phi(r_1) - \Phi(r_2)$ as:

$$\rho_{ave} = \frac{1}{4\pi Gr} \frac{\delta\Phi(r)}{\delta r} + \frac{m(r)}{r^3} \qquad (10)$$

The average formation density $\rho_{ave}$ can be determined with an accuracy $\Delta\rho_{ave}$, for example, about $\pm 0.01$ g/cm$^3$. Given the accuracy $\Delta\rho_{ave}$ of about $\pm 0.01$ g/cm$^3$, a corresponding measurement precision for the gravitational potential difference $\delta\Phi(r)$ can be about 4% of a measurement precision of the free-air gradient. In one embodiment, the measurement precision for the gravitational potential difference $\delta\Phi(r)$ can be around 5.3 m$^2$/s$^2$ or better which can correspond to a density error of about 0.01 g/cm$^3$ or less.

In some embodiments, a density $\rho$ of a geological formation, such as the above average formation density $\rho_{ave}$, between a first and a second positions such as the above $r_1$ and $r_2$, can be determined by a generally monotonically increasing function of the gravitational potential difference determined. Such function can be linear or non-linear. A Taylor series can be used to represent the non-linear function. In one embodiment, a lowest-order linear approximation of the Taylor series can be used to determine the density $\rho$:

$$\rho = a \frac{\Delta\Phi}{d} + b \qquad (11)$$

wherein $\Delta\Phi$ is the gravitational potential difference determined, d is a vertical distance between the first and second positions, and a and b are coefficients. A specific example of such general relationship in Equation (11) is illustrated by Equation (10) described above where the coefficient a can be determined by $$\frac{1}{4\pi GR}$$

and the coefficient b can be determined by $$\frac{M}{R^3},$$

with G being the gravitational constant, R being the earth radius, and M being the earth mass. It will be appreciated that the format of said general relationship between formation density and gravitational potential difference may vary without changing its substance.

Generally, the differential gravimetry measurement processes described herein, including, for example, photon emission, propagation and absorption, can operate at speeds much faster than the typical shock spectrum encountered in, for example, measurement-while-drilling (MWD) or logging-while-drilling (LWD). The differential gravimeters described herein may operate even during the drilling process and in relatively harsh environments including conditions of high temperature, pressure, shock and vibrations encountered for example in MWD/LWD. Furthermore, the gravimeters may well be suited for the mechanically hostile MWD/LWD environment.

The differential gravimeters described herein may also be implemented as a stationary gravimeter, for various surface measurements, or as permanently installed downhole gravimeters for long-duration time-lapse surveys.

The invention claimed is:

1. A system for obtaining a property of a geological formation, the system comprising:
a component including a first portion and a second portion, the first portion extending from a first position to a second position and the second portion extending from the second position to a third position,
the first portion including a first source, a first absorber, and a first detector, the first portion to measure a first frequency shift of gamma radiation travelling between the first position and the second position, the first frequency shift resulted from a gravitational potential difference between the first and second positions,
the second portion including a second source, a second absorber, and a second detector, the second portion to measure a second frequency shift of gamma radiation travelling between the second position and the third position, the second frequency shift resulted from a gravitational potential difference between the second and third positions,
the first and second sources to respectively emit a first gamma radiation and a second gamma radiation to the first and second absorbers, the first and second absorbers to absorb at least a portion of the gamma radiation emitted from the respective source, the first and second detectors operatively connected to the first and second absorbers respectively to detect the absorption and to respectively generate first one or more signals associated with the first frequency shift and second one or more signals associated with the second frequency shift; and
one or more processors operatively connected to the first and second detectors, the processors to receive the first signals associated with the first frequency shift and the second signals associated with the second frequency shift from the first and second detectors respectively, determine a gravitational potential difference between the first position and the third position from the signals received, and determine the property of the geological formation between the first and third positions from the gravitational potential difference determined.

2. The system of claim 1, wherein the first source and the second source comprise a single source disposed at the second position to emit the first and second gamma radiations at substantially opposite directions to the first and second absorbers, respectively.

3. The system of claim 2, wherein the first absorber is at the first position and the second absorber is at the third position.

4. The system of claim 1, wherein the first absorber and the second absorber are both located at the second position to receive the first and second gamma radiations from substantially opposite directions from the first and second sources respectively.

5. The system of claim 4, wherein the first source is at the first position and the second source is at the third position.

6. The system of claim 1, further comprising one or more tuning mechanisms operatively connected to at least one of the first and second sources and the first and second absorbers to compensate the first and/or second frequency shifts and induce a resonant absorption of the first and/or second gamma radiations.

7. The system of claim 6, wherein the tuning mechanisms comprise a mechanical modulator to move the first absorber or the first source relative to each other, and/or move the second absorber or the second source relative to each other.

8. The system of claim 6, wherein the tuning mechanisms comprise a magnetic modulator to generate a magnetic field around at least one of the first source, the second source, the first absorber, and the second absorber.

9. The system of claim 1, wherein the component is a part of a downhole tool.

10. The system of claim 9, wherein the downhole tool comprises a wireline tool, a measurement-while-drilling tool, a logging-while-drilling tool, a coiled tubing tool, a testing tool, a completions tool, a production tool, or combinations thereof.

11. The system of claim 1, wherein the property of the geological formation comprises a density of the geological formation.

12. The system of claim 1, wherein the component further comprises a tuning mechanism to compensate the first frequency shift and the second frequency shift, and the first gamma radiation and the second gamma radiation respectively being resonantly absorbed by the first absorber and the second absorber.

13. A method for determining a property of a geological formation, the method comprising:
transmitting a first gamma radiation between a first position and a second position of the geological formation, the first gamma radiation travelling between the first position and the second position having a first frequency shift, the first frequency shift resulted from a gravitational potential difference between the first and second positions;
transmitting a second gamma radiation between the second position and a third position of the geological formation, the second gamma radiation travelling between the second position and the third position having a second frequency shift resulted from a gravitational potential difference between the second and third positions;
absorbing a least a portion of the first gamma radiation, and absorbing at least a portion of the second gamma radiation;
detecting the absorption of the first gamma radiation, and generating one or more first signals associated with the first frequency shift;
detecting the absorption of the second gamma radiation, and generating one or more second signals associated with the second frequency shift;
determining a gravitational potential difference between the first and third positions based on the first signals and the second signals; and
determining the property of the geological formation based on the gravitational potential difference determined.

14. The method of claim 13, further comprising compensating the first frequency shift and/or compensating the second frequency shift.

15. The method of claim 14, wherein compensating the frequency shift comprises generating a mechanical movement of a source and/or an absorber.

16. The method of claim 14, wherein compensating the frequency shift comprises generating a magnetic field around a source and/or an absorber.

17. The method of claim 13, wherein the property of the geological formation comprises a formation density of the geological formation.

* * * * *